(12) United States Patent  (10) Patent No.: US 12,422,326 B2
Duqi et al.  (45) Date of Patent: Sep. 23, 2025

(54) METHOD FOR DETERMINING CALIBRATED VALUES OF ATMOSPHERIC PRESSURE AND RELATED ELECTRONIC APPARATUS

(71) Applicant: STMICROELECTRONICS S.r.l., Agrate Brianza (IT)

(72) Inventors: Enri Duqi, Milan (IT); Patrick Fedeli, Senago (IT); Nicolo' Manca, Turin (IT); Silvia Adorno, Novate Milanese (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 324 days.

(21) Appl. No.: 18/169,818

(22) Filed: Feb. 15, 2023

(65) Prior Publication Data

US 2023/0314257 A1  Oct. 5, 2023

(30) Foreign Application Priority Data

Mar. 1, 2022  (IT) .......... 102022000003803

(51) Int. Cl.
*G01L 27/00* (2006.01)
*H02J 50/10* (2016.01)

(52) U.S. Cl.
CPC ............ *G01L 27/005* (2013.01); *H02J 50/10* (2016.02)

(58) Field of Classification Search
CPC ........ G01C 5/06; G01C 25/00; G01C 21/206; G01C 21/20; G01C 25/005; G01C 5/005; G01C 21/165; G01C 21/1654; G01C 5/00; G01C 21/1656; G01C 23/00; G01C 5/04; G01C 21/383; G01C 21/188; G01C 22/006; G01C 13/00; G01C 13/008; G01C 21/3885; G01C 15/002; G01C 19/00; G01C 9/00; G01C 21/3667; G01C 22/00; G01C 3/08; G01C 15/008; G01C 21/005; G01C 21/1652; G01C 22/002; G01C 21/183; G01C 21/30; G01C 19/02; G01C 21/16; G01C 21/26; G01C 21/28; G01C 21/3844; G01C 21/08; G01C 21/34; G01C 17/38; G01C 21/025; G01C 21/3859; G01L 27/005; G01L 27/002; G01L 21/12; G01L 25/00; G01L 11/02; G01L 19/0092; G01L 9/0072; G01L 19/02; G01L 27/007;

(Continued)

(56) References Cited

U.S. PATENT DOCUMENTS

| 10,921,121 B2 * | 2/2021 | Dormody ................ H04W 4/38 |
| 2016/0102995 A1 * | 4/2016 | Gum ...................... H04W 4/029 |
| | | 702/98 |

(Continued)

FOREIGN PATENT DOCUMENTS

| JP | 3461273 B2 * | 10/2003 |
| JP | 2012247296 A * | 12/2012 |

(Continued)

*Primary Examiner* — Andre J Allen (74) *Attorney, Agent, or Firm* — Seed IP Law Group LLP (57) ABSTRACT

A method of determining calibrated values of atmospheric pressure using a reference value of atmospheric pressure and measured values of atmospheric pressure acquired when movable devices are and are not being inductively charged by a fixed device. An electronic apparatus having the fixed device and the movable devices having movable barometers.

20 Claims, 3 Drawing Sheets

(58) Field of Classification Search
CPC ......... G01L 19/04; G01L 19/086; G01L 9/00; G01L 13/00; G01L 19/12; G01L 9/0073; G01L 19/147; G01L 19/08; G01L 15/00; G01L 27/00; G01L 11/00; G01L 21/00; G01L 19/083; G01L 9/12; G01L 9/0077; G01L 19/0084; G01L 9/007; G01L 19/14; G01L 7/00; G01L 19/00; G01L 7/14; G01L 19/142; G01L 9/0079; G01L 11/025; G01L 13/025; G01L 19/148; G01L 9/02; G01L 5/16; G01L 7/104; G01L 7/18; G01L 1/205; G01L 11/002; G01L 19/0023; G01L 19/0645; G01L 1/02; G01L 1/146; G01L 1/24; G01L 5/00; G01L 7/063; G01L 7/182; G01L 21/14; G01L 21/32; G01L 19/10; G01L 5/169; G01L 9/0042; G01L 19/0007; G01L 9/06; G01L 19/0015; G01L 9/04; G01L 9/065; G01L 1/2268; G01L 17/00; G01L 9/0076; G01L 1/144; G01L 1/148; G01L 19/0046; G01L 21/10; G01L 9/0002; G01L 9/0033; G01L 9/0054; G01L 1/2206; G01L 13/06; G01L 19/0038; G01L 19/0627; G01L 5/1627; G01L 7/084; G01L 9/001; G01L 9/0035; G01L 9/0055; G01L 9/0092; G01L 9/08; G01L 1/005; G01L 1/14; G01L 19/149; G01L 19/16; G01L 23/08; G01L 23/16; G01L 27/02; G01L 5/226; G01L 7/20; G01L 1/242; G01L 11/06; G01L 13/02; G01L 19/0061; G01L 19/143; G01L 3/247; G01L 5/13; G01L 5/225; G01L 7/026; G01L 7/028; G01L 7/041; G01L 7/12; G01L 9/0075; G01L 9/125; G01L 1/00; G01L 23/06; G01L 7/043; G01L 9/0016; G01L 9/0089; G01L 9/025; G01L 9/10; G01L 1/04; G01L 1/142; G01L 1/2287; G01L 11/006; G01L 11/04; G01L 19/0672; G01L 23/125; G01L 5/133; G01L 7/06; G01L 7/08; G01L 7/16; G01L 9/0022; G01L 9/0047

See application file for complete search history.

(56) References Cited

U.S. PATENT DOCUMENTS

2016/0245716 A1* 8/2016 Gum .................... G01L 27/002
2018/0255431 A1* 9/2018 Robertson ........... G01C 21/005

FOREIGN PATENT DOCUMENTS

WO WO-2015066139 A1 * 5/2015 ............... G01C 5/06
WO WO-2019027367 A1 * 2/2019 ............... G01L 7/00

* cited by examiner

METHOD FOR DETERMINING CALIBRATED VALUES OF ATMOSPHERIC PRESSURE AND RELATED ELECTRONIC APPARATUS

BACKGROUND

Technical Field

The present disclosure relates to a method for determining calibrated values of atmospheric pressure, and to a related electronic apparatus.

Description of the Related Art

As is known, the electronic apparatuses currently on the market comprise sensors configured to measure respective quantities (e.g., physical, electrical, magnetic).

In particular, different electronic apparatuses each comprise devices that may be physically decoupled from each other, for each of which a respective measurement of atmospheric pressure is required in order for them to function correctly. In other words, considering that the atmospheric pressure is correlated, in a known manner, to altitude, knowing the height of each of these devices with respect to a common reference point is necessary so that the electronic apparatus may be used in an optimal manner.

For example, knowing the height difference of joystick controllers (e.g., each held in a respective hand of a user) with respect to a pair of smartglasses (worn on the user's face) is necessary: in this case, the smartglasses are considered as a substantially stationary reference point since generally the user's head does not vary significantly in altitude during the game, while the joystick controllers are moved by the user for example to control game functionalities and therefore are movable with respect to the smartglasses.

Moreover, knowing the height difference between a user's shoes relative to a reference point (e.g., the user's chest or head) may be necessary. For example, shoes are known that integrate air cushions with pressure sensors to measure the shift of the user's weight from one foot to the other during walking, for biomedical purposes for monitoring the posture of patients suffering from pathologies. However, this solution allows knowing only the weight distribution on the shoes and not also the heights of the shoes with respect to ground.

Moreover, knowing the height difference between a smartphone (considered substantially stationary as it is generally carried for example in the user's trouser pockets) and a smartwatch (worn on the user's wrist and therefore movable with respect to the smartphone to sense movements of the user's arm) may be useful, for example to better monitor the user's physical activity.

Nevertheless, the barometers used to measure the atmospheric pressure whereat each device is have measurement uncertainties that are generally comparable (if not even higher) with the atmospheric pressure differences to be measured in the above-mentioned applications. In particular, it is known that a barometer integrated in a device (e.g., by soldering) has a measurement uncertainty of the atmospheric pressure, due for example to manufacturing tolerances, which is of the order of magnitude of tens of pascals and that, moreover, varies over time as a function of factors such as the wear of the same barometer and the environmental conditions wherein it is used (generally it varies by about 1 hPa every year of the life of the barometer); moreover, it is known that barometers commonly on the market measure atmospheric pressure variations by about 1 hPa for about every 8 m of height variation. Consequently, these measurement uncertainties of atmospheric pressure may lead to errors in the height measurement even in the order of magnitude of meters, when instead these applications usually require a sensitivity of the order of magnitude of tens of centimeters.

In view of this, the measurements carried out by known barometers are not sufficiently accurate to be used in different applications, such as those previously described.

Known solutions comprise the calibration of barometers immediately after their manufacturing and before sale, in order to reset measurement uncertainties due to manufacturing tolerances. However, these solutions do not solve all the above-mentioned problems, in particular they do not allow compensating the measurement uncertainty variations which are variable over time.

BRIEF SUMMARY

The present disclosure is directed to a method for determining calibrated values of atmospheric pressure and a related electronic apparatus.

The method comprising determining a first and a second calibrated value of atmospheric pressure by an electronic apparatus including a fixed device and at least a first and a second movable barometer operatively couplable to the fixed device, the fixed device being a charging dock-station for electric charging, of wireless and induction type, of the first and the second movable barometer, in a first operative condition of the electronic apparatus, preventing the electric charging by the fixed device by electromagnetically decoupling at least one of the first and the second movable barometer from the fixed device, and in a second operative condition of the electronic apparatus charging by the fixed device by physically contacting and electromagnetically coupling the first and the second movable barometers with the fixed device.

The method including determining by a main control unit coupled to the electronic apparatus, whether the electronic apparatus is in the second operative condition, if the electronic apparatus is in the second operative condition, acquiring by the main control unit a first measured value of atmospheric pressure through the first movable barometer, acquiring by the main control unit a second measured value of atmospheric pressure through the second movable barometer, and acquiring a reference value of atmospheric pressure at a common reference point of the fixed device of the electronic apparatus, the first and the second movable barometers being, in the second operative condition, at first and second height differences with respect to the common reference point.

Furthermore, the method includes calculating, by the main control unit, a first pressure difference as a function of the first measured value and of the reference value, and a second pressure difference as a function of the second measured value and of the reference value, and when the electronic apparatus switches from the second operative condition to the first operative condition, acquiring, by the main control unit, a new first measured value of atmospheric pressure through the first movable barometer and a new second measured value of atmospheric pressure through the second movable barometer, and determining, by the main control unit, said first calibrated value as a function of the new first measured value and of the first pressure difference, and said second calibrated value as a function of the new second measured value and of the second pressure difference.

BRIEF DESCRIPTION OF THE SEVERAL VIEWS OF THE DRAWINGS

For a better understanding of the present disclosure, a preferred embodiment is now described, purely by way of non-limiting example, wherein.

In particular, the Figures are shown with reference to a triaxial Cartesian system defined by an X axis, a Y axis and a Z axis, orthogonal to each other.

DETAILED DESCRIPTION

In the following description, elements common to the different embodiments have been indicated with the same reference numbers.

Figure 1:
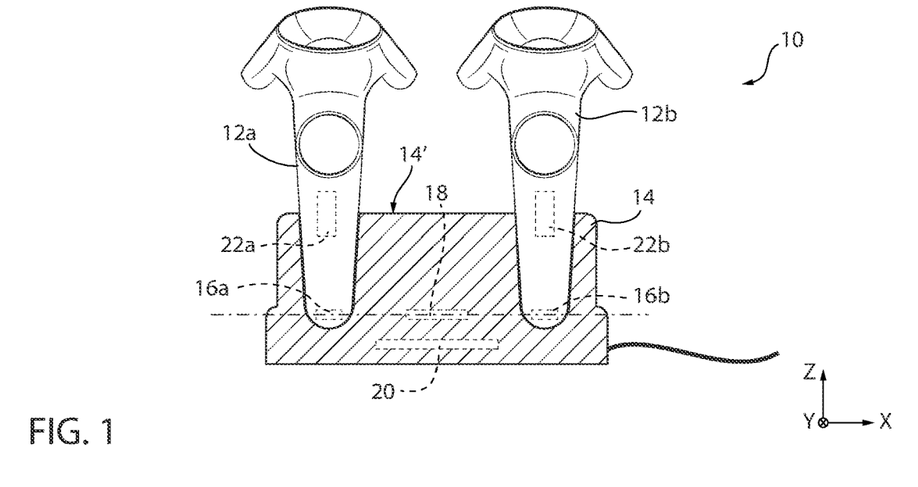
FIG. 1 shows a schematic perspective view of an electronic apparatus, according to an embodiment.

FIG. 1 shows an electronic apparatus 10 which, in this embodiment, comprises a first movable device 12a, a second movable device 12b and a fixed device 14. Although, in the following case wherein the electronic apparatus 10 comprises two movable devices 12a, 12b is exemplarily considered, the number of movable devices may similarly be greater than two.

The first movable device 12a and the second movable device 12b are movable to each other and relative to the fixed device 14. In particular, in a first operative condition of the electronic apparatus 10 at least one of the movable devices 12a and 12b is physically and electromagnetically decoupled from the fixed device 14, while in a second operative condition of the electronic apparatus 10 all the movable devices 12a and 12b are in physical contact with the fixed device 14 and are electromagnetically coupled with the latter.

In detail, in the present embodiment, in the second operative condition the movable devices 12a and 12b are coupled to the fixed device 14 so as to be at the same altitude as each other, i.e., so as to be at the same height as each other relative to a common reference point (e.g., substantially a point or point-like region of the electronic apparatus 10, for example of the fixed device 14).

For example, in the second operative condition the movable devices 12a and 12b are rested on a top surface 14' of the fixed device 14. Optionally, the fixed device 14 has a seat, at the top surface 14', for each movable device 12a and 12b, which is patterned in such a way that it accommodates (e.g., interlocking) the respective movable device 12a and 12b.

In detail, the fixed device 14 is an alignment station, in particular a charging dock-station for the wireless and induction electric charging of the movable devices 12a, 12b.

In greater detail, the fixed device 14 comprises transmission coils (not shown) and each movable device 12a, 12b comprises respective reception coils (not shown) which, in the second operative condition, are inductively coupled with the transmission coils: in use, when the movable devices 12a, 12b are in contact with the fixed device 14, the transmission coils generate a magnetic field which traverses the reception coils generating induced currents in the latter which, through respective charging circuits of the movable devices 12a, 12b (not shown and of known type), electrically charge respective batteries of the movable devices 12a, 12b (not shown and for powering the movable devices 12a, 12b).

Consequently, with electromagnetic coupling between the movable devices 12a, 12b and the fixed device 14, the electromagnetic interference phenomena (i.e., noise) induced between the movable devices 12a, 12b and the fixed device 14 are not considered herein, but rather electromagnetic interactions between the movable devices 12a, 12b and the fixed device 14 for electrically charging the movable devices 12a, 12b by the fixed device 14, through known induction charging techniques (e.g., possibly assisted by data exchange between the movable devices 12a, 12b and the fixed device 14 to confirm or deny the charging).

Each movable device 12a, 12b further comprises at least one respective atmospheric pressure sensor, in particular a respective barometer (hereinafter referred to as first movable barometer 16a of the first movable device 12a and second movable barometer 16b of the second movable device 12b). The movable barometers 16a and 16b are configured to measure respective atmospheric pressure values, correlated to the respective altitudes whereat the movable barometers 16a, 16b are placed (i.e., correlated to the respective heights with respect to the common reference point). The height of each movable device 12a, 12b with respect to the common reference point is considered equal to the height of the respective movable barometer 16a, 16b with respect to the common reference point.

In the present embodiment, the fixed device 14 further comprises at least one further atmospheric pressure sensor, in particular a further barometer (hereinafter referred to as fixed barometer 18). The fixed barometer 18 is configured to measure an atmospheric pressure value correlated to the altitude whereat the fixed barometer 18 is placed (i.e., correlated to its height with respect to the common reference point). The height of the fixed device 14 with respect to the common reference point is considered equal to the height of the fixed barometer 18 with respect to the common reference point.

In the present embodiment considered herein for illustrative purposes, the fixed barometer 18 is considered as the common reference point. However, alternatively, the common reference point may also be the first or the second movable barometer 16a, 16b, as better described hereinafter.

In particular, the first and the second movable barometers 16a, 16b are placed, in the second operative condition, at respective predefined height differences Δh with respect to the common reference point (here exemplarily the fixed barometer 18). In the embodiment of FIG. 1, the movable devices 12a and 12b are at the same height with respect to the common reference point and therefore the predefined height differences Δh are null. However, in further embodiments the predefined height differences Δh may not be null, as better described hereinafter.

The fixed device 14 further comprises a main control unit 20 operatively coupled to the movable barometers 16a, 16b and to the fixed barometer 18 and configured to acquire, therethrough, the respective measured values of atmospheric pressure. In detail, in use, the main control unit 20 receives a first measured value of atmospheric pressure $P_1$ from the first movable barometer 16a, a second measured value of atmospheric pressure $P_2$ from the second movable barometer 16b and a reference value of atmospheric pressure $P_{rif}$. The reference value of atmospheric pressure $P_{rif}$ is measured at the common reference point of the electronic apparatus 10: in the embodiment exemplarily considered herein, the reference value of atmospheric pressure $P_{rif}$ is therefore a fixed measured value of atmospheric pressure $P_f$ measured by the fixed barometer 18.

For example, each movable device 12a, 12b comprises a respective control unit 22a, 22b electrically coupled to the respective movable barometer 16a, 16b and operatively coupled (e.g., through a respective transceiver module not shown and comprised in the respective control unit 22a, 22b) to the main control unit 20 to communicate data with the latter, for example to send the measured values of atmospheric pressure $P_1$ and $P_2$ to the latter. Moreover, the main control unit 20 is for example electrically coupled to the fixed barometer 18 to receive the reference value of atmospheric pressure $P_{rif}$ from the latter.

In the embodiment exemplarily considered in FIG. 1, the first and the second movable devices 12a and 12b are for example joystick controllers and the fixed device 14 is a wireless charging dock-station for the joystick controllers. Nevertheless, the indicated types of movable devices 12a and 12b and the fixed device 14 are provided herein for illustrative purposes only and may vary, as better discussed hereinafter.

The electronic apparatus 10 performs, in use, a method 50 for determining calibrated values of atmospheric pressure.

Figure 2:
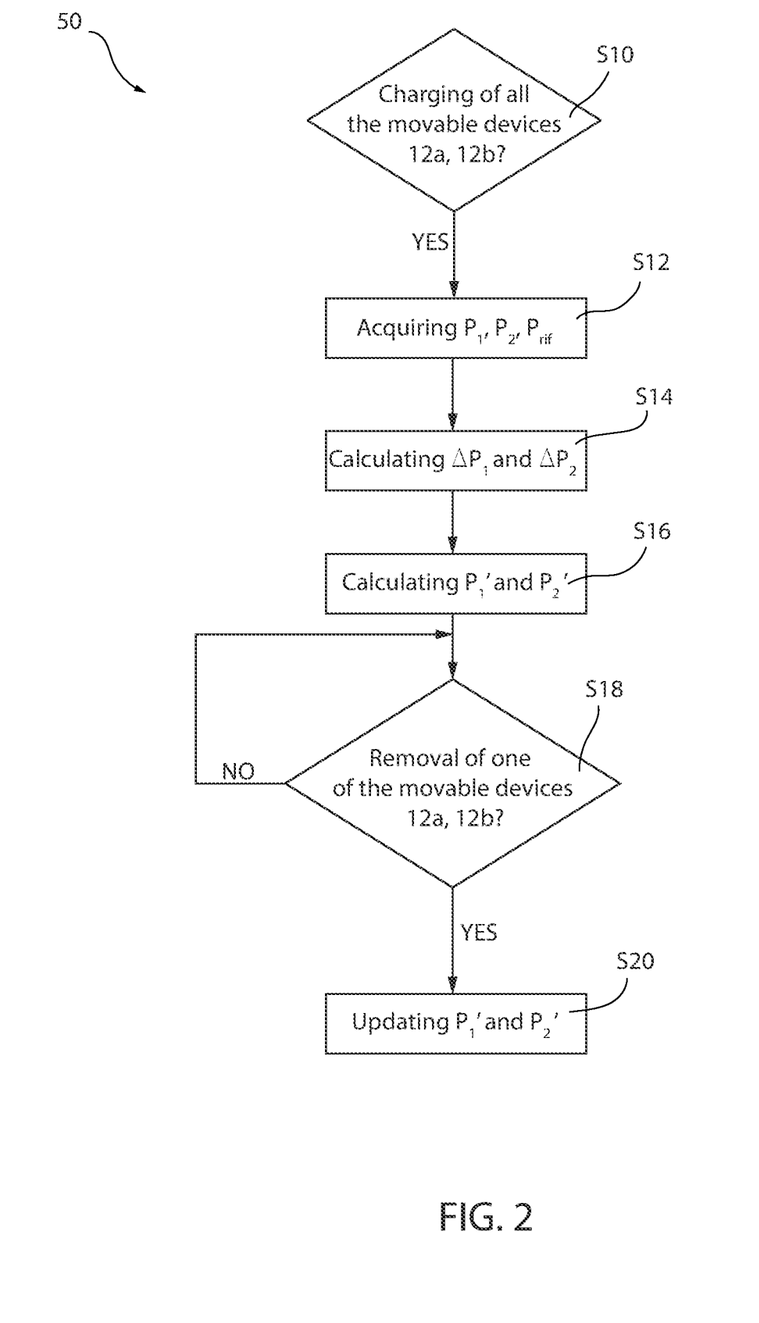
FIG. 2 shows a block diagram of a method for determining calibrated values of atmospheric pressure of the electronic apparatus of FIG. 1, according to an embodiment.

An embodiment of the method 50 is described hereinafter with reference to FIG. 2, exemplarily on the basis of the electronic apparatus 10 of FIG. 1.

At a step S10 of the method 50, it is verified whether the electronic apparatus 10 is in the second operative condition, therefore whether all the movable devices 12a and 12b are in physical contact with the fixed device 14 and are electromagnetically coupled with the latter. In other words, it is verified whether all the movable devices 12a and 12b are simultaneously being charged through electromagnetic induction by the fixed device 14. This verification is performed in a per se known manner, similarly to how it is commonly sensed when to start the charging in known induction charging devices (e.g., through pressure sensors which sense the presence of the movable devices 12a and 12b, or alternative known techniques).

If the electronic apparatus 10 is in the second operative condition, at a step S12 consecutive to step S10, the first and the second measured values of atmospheric pressure $P_1$ and $P_2$ are acquired through the first and the second movable barometers 16a and 16b and the reference value of atmospheric pressure $P_{rif}$ (here exemplarily through the fixed barometer 18). In detail, in the exemplarily considered embodiment, the main control unit 20 acquires the values of atmospheric pressure $P_1$, $P_2$ and $P_{rif}$ through the barometers 16a, 16b and 18.

At a step S14 consecutive to step S12, a first pressure difference $\Delta P_1$ and a second pressure difference $\Delta P_2$ are calculated (in detail, by the main control unit 20), as a function of the reference value of atmospheric pressure $P_{rif}$ and, respectively, of the first and the second measured values of atmospheric pressure $P_1$ and $P_2$. In detail, in the embodiment of FIG. 1 wherein the movable devices 12a and 12b are at the same height relative to the fixed device 14 when the electronic apparatus 10 is in the second operative condition, the first pressure difference $\Delta P_1$ is equal to the difference between the first measured value of atmospheric pressure $P_1$ and the reference value of atmospheric pressure $P_{rif}$, and the second pressure difference $\Delta P_2$ is equal to the difference between the second measured value of atmospheric pressure $P_2$ and the reference value of atmospheric pressure $P_{rif}$. In other words, $\Delta P_i = P_i - P_{rif}$ with i=1,2 (or with i=1, . . . , N in case of N>2 movable devices of the electronic apparatus 10). In this case considered, the pressure differences $\Delta P_1$ and $\Delta P_2$ result from measurement uncertainties of the barometers used (e.g., due to manufacturing tolerances or drifts over time of the responses of the barometers to height variations whereto they are subject), therefore they need to be reset to have accurate measurements by the movable barometers 16a, 16b.

At a step S16 (optional) consecutive to step S14, a first calibrated value of atmospheric pressure $P_1'$ and a second calibrated value of atmospheric pressure $P_2'$ are determined (in detail, by the main control unit 20) as a function of the reference value of atmospheric pressure $P_{rif}$, when the electronic apparatus 10 is in the second operative condition. In detail, in the present embodiment of the electronic apparatus 10, as long as the electronic apparatus 10 is in the second operative condition, the first and the second calibrated values of atmospheric pressure $P_1'$ and $P_2'$ are equal to the reference value of atmospheric pressure $P_{rif}$. In other words, in the second operative condition $P_i' = P_{rif}$ with i=1,2 (or with i=1, . . . , N).

At a step S18 consecutive to step S16, it is verified whether the electronic apparatus 10 switches from the second operative condition to the first operative condition, therefore whether at least one of the movable devices 12a and 12b is physically and electromagnetically decoupled from the fixed device 14. In other words, it is verified whether at least one of the movable devices 12a and 12b is no longer being charged through electromagnetic induction by the fixed device 14. This verification is performed in a per se known manner, similarly to how it is commonly sensed when to stop the charging in known induction charging devices.

After the electronic apparatus 10 has returned to the first operative condition, at a step S20 consecutive to step S18, the first and the second calibrated values of atmospheric pressure $P_1'$, $P_2'$ are updated. In particular, the updating is performed periodically by repeating step S20 (e.g., at a frequency equal to the output data rate of the barometers 12a, 12b and 18). In detail, the determination of the first and the second calibrated values of atmospheric pressure $P_1'$, $P_2'$ occurs, at each updating iteration, by acquiring a new first and a new second measured value of atmospheric pressure $P_1$ and $P_2$ through the first and the second movable barometers 16a and 16b and calculating a new first and a new second calibrated value of atmospheric pressure $P_1'$, $P_2'$ as a function of the new first and, respectively, of the new second measured values of atmospheric pressure $P_1$, $P_2$ and of the first and, respectively, of the second pressure differences $\Delta P_1$ and $\Delta P_2$. In greater detail, the first updated calibrated value of atmospheric pressure $P_i'$ is equal to the sum of the first pressure difference $\Delta P_1$ and the first measured value of atmospheric pressure $P_1$ acquired at step S20, and the second updated calibrated value of atmospheric pressure $P_2'$ is equal to the sum of the second pressure difference $\Delta P_2$ and the second measured value of atmospheric pressure $P_2$ acquired at step S20. In other words, in the first operative condition $P_i' = P_i + \Delta P_i$ with i=1,2 (or with i=1, . . . , N).

The updating of step S20 continues until a new charging of the movable devices 12a and 12b is performed (i.e., until the occurrence of the condition at step S10 is determined again). When performing a new charging as described at step S10, steps S12-S20 are repeated.

Figure 3:
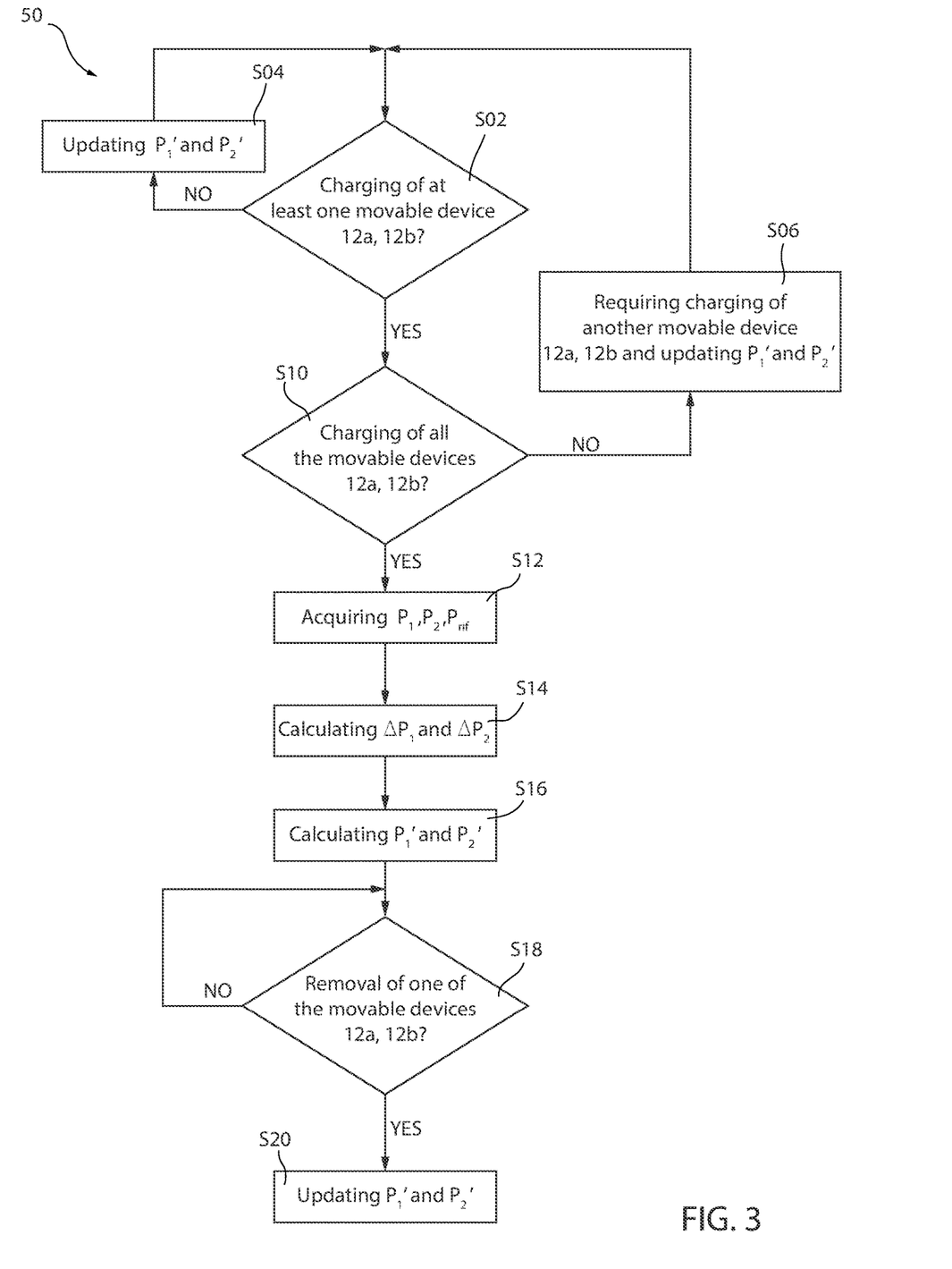
FIG. 3 shows a block diagram of a further embodiment of the method for determining calibrated values of atmospheric pressure of the electronic apparatus of FIG. 1.

With reference to the embodiment of method 50 shown in FIG. 3, it is seen how method 50 may optionally include further steps.

For example, at a step S02 preceding step S10, it is initially verified whether at least one of the movable devices 12a, 12b is in the charging position (i.e., it is physically and electromagnetically coupled to the fixed device 14). If this condition is not confirmed (i.e., no movable device 12a, 12b is in the charging position), at a step S04 the first and the second calibrated values of atmospheric pressure $P_1'$, $P_2'$ are updated as previously described with reference to step S20. If, on the other hand, this condition is confirmed, the method proceeds to step S10.

Moreover, in addition to or in place of steps S02 and S04, the method 50 may optionally also include a step S06 in case the condition at step S10 is not confirmed (i.e., in case the electronic apparatus 10 is not in the second operative condition wherein all the movable devices 12a, 12b are charged at the same time). In this case, at step S06 the electronic apparatus 10 signals to the user a request of charging of both movable devices 12a, 12b (or all movable devices, in case N>2), so as to push the user to charge all movable devices in order to be able to perform a new calibration. For purely illustrative and non-limiting purposes, this signaling may be the activation of a specific LED of the movable device 12a, 12b not yet placed in charge, or a vibration of the same, or a written message shown to the user through a display (external and operatively coupled to the electronic apparatus 10, or comprised in the fixed device 14 or in the movable device 12a, 12b not yet placed in charge). Moreover, at the same time as this signaling to the user occurs, at step S06 the first and the second calibrated values of atmospheric pressure $P_1'$, $P_2'$ continue to be updated as previously described with reference to step S20.

Figure 4:
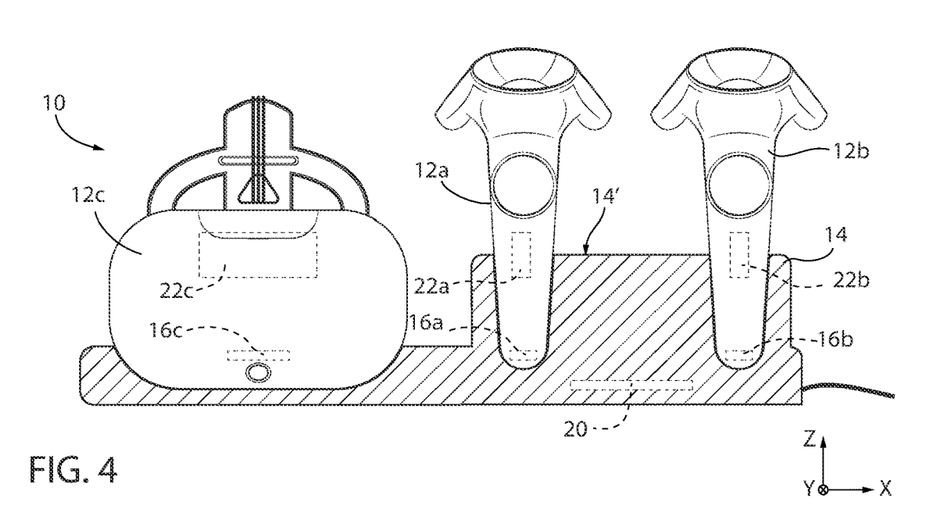
FIGS. 4 and 5 show schematic perspective views of respective and further embodiments of the electronic apparatus.

FIG. 4 shows a different embodiment of the electronic apparatus 10.

The apparatus 10 of FIG. 4 is similar to that of FIG. 1 but also comprises a third movable device 12c. The third movable device 12c is similar to the first and the second movable devices 12a, 12b and therefore is not again described in detail. For example, the third movable device 12c is augmented reality smartglasses.

In this case, the common reference point may for example be the third barometer 16c of the third movable device 12c, and therefore the fixed barometer 18 may also be absent.

Figure 5:
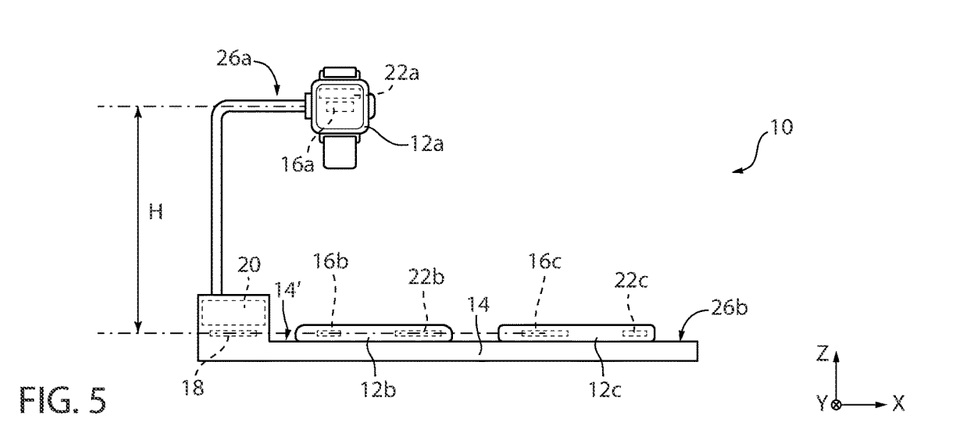

FIG. 5 shows a further embodiment of the electronic apparatus 10.

In particular, the electronic apparatus 10 of FIG. 5 is similar to that of FIG. 1 but in this case in the second operative condition wherein the charging of the movable devices occurs, the movable devices do not all extend to the same height with respect to the common reference point (e.g., here again the fixed barometer 18 for illustrative purposes). In FIG. 4 in fact, the movable devices may be coupled to the fixed device 14 so as to be at heights, with respect to the common reference point, that are predefined and not all equal to each other. In other words, the height differences Δh are predefined and not all equal to each other.

For illustrative and non-limiting purposes, the electronic apparatus of FIG. 5 has a first movable device 12a which, while being charged, is rested on a first support portion 26a of the fixed device 14 so as to extend to a first height with respect to the common reference point, and has a second and a third movable device 12b and 12c which, while being charged, are rested on a second support portion 26b of the fixed device 14 so as to extend to a second height with respect to the common reference point, different from the first height (for example lower than the first height in the example of FIG. 5). In particular, the support portions 26a and 26b extend to heights different from each other with respect to the common reference point (e.g., measured from respective top surfaces of the support portions 26a and 26b, whereon the movable devices 12a-12c are rested during the charging) in such a way that, when the movable devices 12a-12c are rested on the respective support portions 26a and 26b during the charging, the respective movable barometers 16a-16c are respectively at the first or the second heights with respect to the common reference point. The first and the second heights with respect to the common reference point are known and established during the design step of the structure of the fixed device 14, therefore they do not vary over time. In other words, considering the Z axis as an axis orthogonal to surfaces each identified by a respective height with respect to the common reference point, during charging the first movable device 12a is distant, along the Z axis, from the second and the third movable devices 12b, 12c by a relative difference in height H, predefined and invariable.

Moreover, although the example considered refers to three movable devices 12a-12c placed at two different heights with respect to the common reference point, it is apparent that the number of movable devices, the number of heights with respect to the common reference point and the number of support portions may vary and be for example greater (e.g., four movable devices that may be supported by four respective support portions so as to be at four respective heights with respect to the common reference point, different from each other) or smaller (e.g., two movable devices that may be supported by two respective support portions so as to be at two respective heights with respect to the common reference point, different from each other).

In the example considered in FIG. 5, the first movable device 12a is a smartwatch, the second and the third movable devices 12b and 12c are smartphones and the fixed device 14 is a known induction charging dock-station for smartphones and smartwatches, wherein the second support portion 26b is an induction charging pad which has a flat top surface whereon smartphones are rested to be charged and wherein the first support portion 26a comprises an arm that protrudes along the Z axis from the top surface of the charging pad and which functions as a support for the smartwatch during its charging so as to have the smartwatch at a height with respect to the common reference point different from that of the smartphones, to reduce the size area of the fixed device 14 on the support whereon it is placed.

In the case of FIG. 5, the method 50 is implemented similarly to what has been described with reference to FIG. 2 or 3, except for some differences in steps S14 and S16.

In fact, in this case at step S14 the i-th pressure difference $\Delta P_i$ is calculated as a function of the reference value of atmospheric pressure $P_{rif}$, of the i-th measured value of atmospheric pressure $P_i$ and also of an i-th predefined atmospheric pressure difference $\Delta P_{hi}$ (with i=1, . . . , N for N movable devices of the electronic apparatus 10). The i-th predefined atmospheric pressure difference $\Delta P_{hi}$ is a pressure difference indicative of the height difference of the i-th movable device 12a-12c with respect to the common reference point during the charging of the movable devices 12a-12c. In detail, the i-th predefined atmospheric pressure difference $\Delta P_{hi}$ is directly proportional to the predefined height difference $\Delta h_i$ of the i-th movable device 12a-12c with respect to the common reference point. In greater detail, $\Delta P_{hi}=-K\cdot\Delta h_i$ wherein K is a multiplication coefficient (in particular, equal to about 1 hPa/8 m considering that barometers measure a pressure difference by about 1 hPa for about every 8 m of altitude variation) and $\Delta h_i = h_i - h_{rif}$ with $h_i$ being the height of the i-th movable device $12a$-$12c$ (in particular, the height of the i-th movable barometer $16a$-$16c$ of the respective movable device $12a$-$12c$) with respect to the common reference point and $h_{rif}$ which is the height of the fixed device $14$ (in particular, the height of the fixed barometer $18$) with respect to the common reference point.

Moreover, considering the embodiment of FIG. 5, at step S16 the first and the second calibrated values of atmospheric pressure $P_1'$ and $P_2'$ are determined as a function of both the reference value of atmospheric pressure $P_{rif}$ and the respective predefined atmospheric pressure differences $\Delta P_{hi}$. In detail, as long as the electronic apparatus $10$ is in the second operative condition, the first and the second calibrated value of atmospheric pressure $P_i'$ and $P_2'$ are equal to the sum of the reference value of atmospheric pressure $P_{rif}$ and the respective predefined atmospheric pressure differences $\Delta P_{hi}$. In other words, in the second operative condition $P_i'=P_{rif}+\Delta P_{hi}$, so as to take into account the effect in atmospheric pressure of the predefined height differences $\Delta h$.

When the movable devices $12a$-$12c$ are all at the same height with respect to the common reference point, the respective predefined height differences $\Delta h$ are constant and equal to each other and therefore the respective predefined atmospheric pressure differences $\Delta P_h$ are constant and equal to each other. In view of this, in this case the predefined atmospheric pressure differences $\Delta P_h$ may not be considered (in other words, $\Delta P_{hi}$ may be considered constant for each movable device $12a$-$12c$ and equal to 0 hPa) since, in any case, the respective contributions do not generate asymmetries between the respective pressure differences $\Delta P_i$ or between the calibrated values of atmospheric pressure $P_i'$ of step S16 and therefore are not relevant for the correct calibration of the measurements of the movable barometers $16a$-$16c$.

Otherwise, in case the movable devices $12a$-$12c$ are at heights, with respect to the common reference point, that are different from each other, the respective predefined height differences $\Delta h$ are different from each other and therefore the respective predefined atmospheric pressure differences $\Delta P_h$ are different from each other. In this case, it is necessary to take into account the predefined atmospheric pressure differences $\Delta P_h$ in calculating the pressure differences $\Delta P$ and the calibrated values of atmospheric pressure $P'$ at step S16, to compensate for height asymmetries of the movable devices $12a$-$12c$ during the charging and therefore to have a correct calibration of the measurements of the movable barometers $16a$-$16c$.

From an examination of the characteristics of the disclosure made according to the present disclosure, the advantages that it affords are evident.

In particular, the method $50$ allows the differences between the measurements of the atmospheric pressure of the movable barometers $16a$-$16c$ (e.g., due to manufacturing tolerances or drifts over time) to be periodically reset, making these measurements refer to a reference measurement so as to have a common reference for all the movable barometers $16a$-$16c$. In particular, when the movable devices $16a$-$16c$ are being charged, the respective pressure measurements $P_i$ are set to a value that is a function of a predefined reference value (in detail, the reference value of atmospheric pressure $P_{rif}$) and the respective measured atmospheric pressure differences $\Delta P_i$ are used, when the movable devices $16a$-$16c$ are no longer being charged, to correct the measured values of atmospheric pressure $P_i$. This allows the measurements of the movable barometers $16a$-$16c$ to be periodically uniformed to a common reference, so to periodically reset any uncertainties or relative measurement errors.

Finally, it is clear that modifications and variations may be made to the disclosure described and illustrated herein without thereby departing from the scope of the present disclosure. For example, the different embodiments described may be combined with each other to provide further solutions.

As already mentioned, the electronic apparatus $10$ may comprise more than two movable devices.

Moreover, the common reference point may be the fixed barometer $18$ or any of the movable barometers $16a$-$16c$, and the reference value of atmospheric pressure $P_{rif}$ may be one of the pressure values measured by these barometers $16a$-$16c$, $18$ or a statistical quantity indicative of them, or of a part of them (e.g., an average of at least two of the fixed measured value of atmospheric pressure $P_f$, the first measured value of atmospheric pressure $P_1$, the second measured value of atmospheric pressure $P_2$ and the third measured value of atmospheric pressure $P_3$).

Moreover, the structure and the function of the electronic apparatus $10$ may vary as a function of the specific application. For example, the movable devices $12a$, $12b$ may be comprised in respective shoes wearable by the user, so to measure the height differences between the shoes in order to recognize the activity performed by the user (e.g. running, cycling, climbing or descending stairs, trekking, etc.).

Moreover, optionally the measurement of the atmospheric pressure values $P_1$, $P_2$ and $P_{rif}$ is performed after a predefined time interval has elapsed since all the movable devices $12a$-$12c$ are coupled to the fixed device $14$ for charging. This allows the barometers $16a$-$16c$ and $18$ to stabilize at a common temperature value, thus avoiding measurement errors due to temperature inhomogeneities between the movable devices $12a$-$12c$ (e.g., due to contact with the user's skin before charging). The predefined time interval is determined empirically as a function of the specific application of the electronic apparatus $10$, but for purely illustrative purposes it may be equal to a few minutes (e.g., about 5 min).

A method ($50$) for determining a first ($P_1'$) and a second ($P_2'$) calibrated value of atmospheric pressure by an electronic apparatus ($10$) may be summarized as including a fixed device ($14$) and at least a first ($12a$) and a second ($12b$) movable device operatively couplable to the fixed device ($14$), the fixed device ($14$) being a charging dock-station for the electric charging, of wireless and induction type, of the first ($12a$) and the second ($12b$) movable devices and the first ($12a$) and the second ($12b$) movable devices including respectively a first ($16a$) and a second ($16b$) movable barometer, wherein in a first operative condition of the electronic apparatus ($10$) at least one of the first ($12a$) and the second ($12b$) movable devices is at a distance from the fixed device ($14$) and is electromagnetically decoupled from the fixed device ($14$) so as to prevent the electric charging thereof by the fixed device ($14$), and in a second operative condition of the electronic apparatus ($10$) the first ($12a$) and the second ($12b$) movable devices are in physical contact with the fixed device ($14$) and are electromagnetically coupled to the fixed device ($14$) so as to allow the electric charging thereof by the fixed device ($14$), wherein the electronic apparatus ($10$) further includes a main control unit ($20$) operatively coupled to the first ($16a$) and the second ($16b$) movable barometers, the method ($50$) including, in succession to each other, the following steps: a. determining (S10), by the main control unit (20), whether the electronic apparatus (10) is in the second operative condition of electric charging of the first (12a) and the second (12b) movable devices; b. if the electronic apparatus (10) is in the second operative condition, acquiring (S12) by the main control unit (20): a first measured value of atmospheric pressure ($P_1$) through the first movable barometer (16a); a second measured value of atmospheric pressure ($P_2$) through the second movable barometer (16b); and a reference value of atmospheric pressure ($P_{rif}$) measured at a common reference point of the electronic apparatus (10), the first (16a) and the second (16b) movable barometers being placed, in the second operative condition, at respective predefined height differences ($\Delta h$) with respect to the common reference point; c. calculating (S14), by the main control unit (20), a first pressure difference ($\Delta P_1$) as a function of the first measured value of atmospheric pressure ($P_1$) and of the reference value of atmospheric pressure ($P_{rif}$), and a second pressure difference ($\Delta P_2$) as a function of the second measured value of atmospheric pressure ($P_2$) and of the reference value of atmospheric pressure ($P_{rif}$); and d. when the electronic apparatus (10) switches from the second operative condition to the first operative condition (S18): acquiring (S20), by the main control unit (20), a new first measured value of atmospheric pressure ($P_1$) through the first movable barometer (16a) and a new second measured value of atmospheric pressure ($P_2$) through the second movable barometer (16b), and determining (S20), by the main control unit (20), said first calibrated value of atmospheric pressure ($P_1'$) as a function of the new first measured value of atmospheric pressure ($P_1$) and of the first pressure difference ($\Delta P_1$), and said second calibrated value of atmospheric pressure ($P_2'$) as a function of the new second measured value of atmospheric pressure ($P_2$) and of the second pressure difference ($\Delta P_2$).

The step of acquiring (S12) the reference value of atmospheric pressure ($P_{rif}$) may include acquiring the reference value of atmospheric pressure ($P_{rif}$) through one of the following: a fixed barometer (18) of the fixed device (14), the fixed barometer (18) defining said common reference point, the reference value of atmospheric pressure ($P_{rif}$) being a fixed measured value of atmospheric pressure ($P_f$) acquired through the fixed barometer (18) or an average of the fixed measured value of atmospheric pressure ($P_f$) and the first measured value of atmospheric pressure ($P_1$) and/or the second measured value of atmospheric pressure ($P_2$); the first movable barometer (16a), defining said common reference point, the reference value of atmospheric pressure ($P_{rif}$) being the first measured value of atmospheric pressure ($P_1$) or an average of the first measured value of atmospheric pressure ($P_1$) and the second measured value of atmospheric pressure ($P_2$) and/or the fixed measured value of atmospheric pressure ($P_f$); the second movable barometer (16b), defining said common reference point, the reference value of atmospheric pressure ($P_{rif}$) being the second measured value of atmospheric pressure ($P_2$) or an average of the second measured value of atmospheric pressure ($P_2$) and the first measured value of atmospheric pressure ($P_1$) and/or the fixed measured value of atmospheric pressure ($P_f$).

When the electronic apparatus (10) is in the second operative condition, the predefined height differences ($\Delta h$) may be null, and the step of calculating (S14) the first ($\Delta P_1$) and the second ($\Delta P_2$) pressure differences may include applying the following formula:

$$\Delta P_i = P_i - P_{rif},$$

where i=1 indicates the first movable barometer (16a) and i=2 indicates the second movable barometer (16b), $\Delta P_i$ is the i-th pressure difference, $P_i$ is the i-th measured value of atmospheric pressure and $P_{rif}$ is the reference value of atmospheric pressure.

When the electronic apparatus (10) is in the second operative condition, at least one predefined height difference ($\Delta h$) may not be null, and the step of calculating (S14) the first ($\Delta P_1$) and the second ($\Delta P_2$) pressure differences may include applying the following formula:

$$\Delta P_i = P_i - P_{rif} + \Delta P_{hi},$$

where i=1 indicates the first movable barometer (16a) and i=2 indicates the second movable barometer (16b), $\Delta P_i$ is the i-th pressure difference, $P_i$ is the i-th measured value of atmospheric pressure, $P_{rif}$ is the reference value of atmospheric pressure and $\Delta P_{hi}$ is an i-th predefined atmospheric pressure difference directly proportional, in absolute value, to the i-th predefined height difference ($\Delta h_i$) between the i-th movable barometer (16a; 16b) and the common reference point when the electronic apparatus (10) is in the second operative condition.

The step of determining (S20) the first ($P_1'$) and the second ($P_2'$) calibrated values of atmospheric pressure when the electronic apparatus (10) may be in the first operative condition may include calculating, for the first calibrated value of atmospheric pressure ($P_1'$), a sum of the new first measured value of atmospheric pressure ($P_1$) and the first pressure difference ($\Delta P_1$) and, for the second calibrated value of atmospheric pressure ($P_2'$), a sum of the new second measured value of atmospheric pressure ($P_2$) and the second pressure difference ($\Delta P_2$).

The step of acquiring (S20) the new first ($P_1$) and second ($P_2$) measured values of atmospheric pressure and the step of determining (S20) the first ($P_1'$) and the second ($P_2'$) calibrated values of atmospheric pressure may be performed, in succession to each other, periodically when the electronic apparatus (10) is in the first operative condition.

The method may further include the step of, when the electronic apparatus (10) is in the second operative condition, determining (S16), by the main control unit (20), said first ($P_1'$) and second ($P_2'$) calibrated values of atmospheric pressure, the first calibrated value of atmospheric pressure ($P_1'$) being, when the electronic apparatus (10) is in the second operative condition, equal to the reference value of atmospheric pressure ($P_{rif}$) if the predefined height difference ($\Delta h_1$) of the first movable barometer (16a) is null, or equal to a sum of the reference value of atmospheric pressure ($P_{rif}$) and the first pressure difference ($\Delta P_1$) if the predefined height difference ($\Delta h_1$) of the first movable barometer (16a) is not null; and the second calibrated value of atmospheric pressure ($P_2'$) being, when the electronic apparatus (10) is in the second operative condition, equal to the reference value of atmospheric pressure ($P_{rif}$) if the predefined height difference ($\Delta h_2$) of the second movable barometer (16b) is null, or equal to a sum of the reference value of atmospheric pressure ($P_{rif}$) and the second pressure difference ($\Delta P_2$) if the predefined height difference ($\Delta h_2$) of the second movable barometer (16b) is not null.

The method may further include at least one of the following steps: determining (S02), by the main control unit (20), whether one of the first (12a) and the second (12b) movable devices is in physical contact with the fixed device (14) and is electromagnetically coupled to the fixed device (14) so as to allow the electric charging thereof by the fixed device (14), wherein the step of determining (S10) whether the electronic apparatus (10) is in the second operative condition is performed if one of the first (12a) and the second (12b) movable devices is in physical contact with the fixed device (14) and is electromagnetically coupled to the fixed device (14); and if the electronic apparatus (10) is not in the second operative condition, generating (S06), by the main control unit (20), a signal of request of charging of the first (12a) and the second (12b) movable devices.

The steps b-c may be performed after a predefined time interval has elapsed from when it has been determined (S10) that the electronic apparatus (10) is in the second operative condition.

An electronic apparatus (10) may be summarized as including a fixed device (14) and at least a first (12a) and a second (12b) movable device operatively couplable to the fixed device (14), the fixed device (14) being a charging dock-station for the electric charging, of wireless and induction type, of the first (12a) and the second (12b) movable devices and the first (12a) and the second (12b) movable devices including respectively a first (16a) and a second (16b) movable barometer, wherein in a first operative condition of the electronic apparatus (10) at least one of the first (12a) and the second (12b) movable devices is at a distance from the fixed device (14) and is electromagnetically decoupled from the fixed device (14) so as to prevent the electric charging thereof by the fixed device (14), and in a second operative condition of the electronic apparatus (10) the first (12a) and the second (12b) movable devices are in physical contact with the fixed device (14) and are electromagnetically coupled to the fixed device (14) so as to allow the electric charging thereof by the fixed device (14), wherein the electronic apparatus (10) further includes a main control unit (20) operatively coupled to the first (16a) and the second (16b) movable barometers and configured to determine (S10) whether the electronic apparatus (10) is in the second operative condition of electric charging of the first (12a) and the second (12b) movable devices; if the electronic apparatus (10) is in the second operative condition, acquire (S12): a first measured value of atmospheric pressure ($P_1$) through the first movable barometer (16a); a second measured value of atmospheric pressure ($P_2$) through the second movable barometer (16b); and a reference value of atmospheric pressure ($P_{rif}$) measured at a common reference point of the electronic apparatus (10), the first (16a) and the second (16b) movable barometers being placed, in the second operative condition, at respective predefined height differences ($\Delta h$) with respect to the common reference point; calculate (S14) a first pressure difference ($\Delta P_1$) as a function of the first measured value of atmospheric pressure ($P_1$) and of the reference value of atmospheric pressure ($P_{rif}$), and a second pressure difference ($\Delta P_2$) as a function of the second measured value of atmospheric pressure ($P_2$) and of the reference value of atmospheric pressure ($P_{rif}$); and when the electronic apparatus (10) switches from the second operative condition to the first operative condition (S18): acquire (S20) a new first measured value of atmospheric pressure ($P_1$) through the first movable barometer (16a) and a new second measured value of atmospheric pressure ($P_2$) through the second movable barometer (16b), and determine (S20) a first calibrated value of atmospheric pressure ($P_1'$) as a function of the new first measured value of atmospheric pressure ($P_1$) and of the first pressure difference ($\Delta P_1$), and a second calibrated value of atmospheric pressure ($P_2'$) as a function of the new second measured value of atmospheric pressure ($P_2$) and of the second pressure difference ($\Delta P_2$).

The measurement of the reference value of atmospheric pressure ($P_{rif}$) may occur through one of the following: a fixed barometer (18) of the fixed device (14), the fixed barometer (18) defining said common reference point, the reference value of atmospheric pressure ($P_{rif}$) being a fixed measured value of atmospheric pressure ($P_f$) acquired through the fixed barometer (18) or an average of the fixed measured value of atmospheric pressure ($P_f$) and the first measured value of atmospheric pressure ($P_1$) and/or the second measured value of atmospheric pressure ($P_2$); the first movable barometer (16a), defining said common reference point, the reference value of atmospheric pressure ($P_{rif}$) being the first measured value of atmospheric pressure ($P_1$) or an average of the first measured value of atmospheric pressure ($P_1$) and the second measured value of atmospheric pressure ($P_2$) and/or the fixed measured value of atmospheric pressure ($P_f$); the second movable barometer (16b), defining said common reference point, the reference value of atmospheric pressure ($P_{rif}$) being the second measured value of atmospheric pressure ($P_2$) or an average of the second measured value of atmospheric pressure ($P_2$) and the first measured value of atmospheric pressure ($P_1$) and/or the fixed measured value of atmospheric pressure ($P_f$).

The electronic apparatus may further include at least a third movable device (12c) operatively couplable to the fixed device (14) and electrically chargeable by the fixed device (14) through wireless and induction charging, the third movable device (12c) may include a third movable barometer (16c) defining said common reference point, wherein in the first operative condition of the electronic apparatus (10) at least one of the first (12a), the second (12b) and the third (12c) movable devices is at a distance from the fixed device (14) and is electromagnetically decoupled from the fixed device (14) so as to prevent the electric charging thereof by the fixed device (14), and in the second operative condition of the electronic apparatus (10) the first (12a), the second (12b) and the third (12c) movable devices are in physical contact with the fixed device (14) and are electromagnetically coupled to the fixed device (14) so as to allow the electric charging thereof by the fixed device (14), the main control unit (20) being further operationally coupled to the third movable barometer (16c) and being further configured to if the electronic apparatus (10) is in the second operative condition, acquire (S12) a third measured value of atmospheric pressure ($P_3$) through the third movable barometer (16c); calculate (S14) a third pressure difference ($\Delta P_3$) as a function of the third measured value of atmospheric pressure ($P_3$) and of the reference value of atmospheric pressure ($P_{rif}$); and when the electronic apparatus (10) switches from the second operative condition to the first operative condition (S18): acquire (S20) a new third measured value of atmospheric pressure ($P_3$) through the third movable barometer (16c), and determine (S20) a third calibrated value of atmospheric pressure ($P_3'$) as a function of the new third measured value of atmospheric pressure ($P_3$) and of the third pressure difference ($\Delta P_3$), wherein the reference value of atmospheric pressure ($P_{rif}$) is the third measured value of atmospheric pressure ($P_3$) or is an average of the third measured value of atmospheric pressure ($P_3$) and the first measured value of atmospheric pressure ($P_1$) and/or the second measured value of atmospheric pressure ($P_2$).

Said predefined height differences ($\Delta h$) may be null, or at least one of said predefined height differences ($\Delta h$) may not be null.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    determining a first and a second calibrated value of atmospheric pressure by an electronic apparatus including a fixed device and at least a first and a second movable barometer operatively couplable to the fixed device, the fixed device being a charging dock-station for electric charging, of wireless and induction type, of the first and the second movable barometer;
    in a first operative condition of the electronic apparatus, preventing the electric charging by the fixed device by electromagnetically decoupling at least one of the first and the second movable barometer from the fixed device; and
    in a second operative condition of the electronic apparatus charging by the fixed device by physically contacting and electromagnetically coupling the first and the second movable barometers with the fixed device;
    determining, by a main control unit coupled to the electronic apparatus, whether the electronic apparatus is in the second operative condition;
    if the electronic apparatus is in the second operative condition,
        acquiring by the main control unit a first measured value of atmospheric pressure through the first movable barometer;
        acquiring by the main control unit a second measured value of atmospheric pressure through the second movable barometer; and
        acquiring a reference value of atmospheric pressure at a common reference point of the fixed device of the electronic apparatus, the first and the second movable barometers being, in the second operative condition, at first and second height differences with respect to the common reference point;
    calculating, by the main control unit, a first pressure difference as a function of the first measured value and of the reference value, and a second pressure difference as a function of the second measured value and of the reference value; and
    when the electronic apparatus switches from the second operative condition to the first operative condition:
        acquiring, by the main control unit, a new first measured value of atmospheric pressure through the first movable barometer and a new second measured value of atmospheric pressure through the second movable barometer; and
        determining, by the main control unit, said first calibrated value as a function of the new first measured value and of the first pressure difference, and said second calibrated value as a function of the new second measured value and of the second pressure difference.

2. The method according to claim 1, wherein the acquiring the reference value comprises acquiring the reference value through one of the following:

a fixed barometer of the fixed device, the fixed barometer defining said common reference point, the reference value being a fixed measured value of atmospheric pressure acquired through the fixed barometer or an average of the fixed measured value and the first measured value and/or the second measured value;

the first movable barometer, defining said common reference point, the reference value being the first measured value or an average of the first measured value and the second measured value and/or the fixed measured value; and the second movable barometer, defining said common reference point, the reference value being the second measured value or an average of the second measured value and the first measured value and/or the fixed measured value.

3. The method according to claim 1, wherein, when the electronic apparatus is in the second operative condition, the first and second height differences are null, and
    wherein the calculating the first and the second pressure differences comprises applying the following formula:

$$\Delta P_i = P_i - P_{rif},$$

where $i=1$ indicates the first movable barometer and $i=2$ indicates the second movable barometer, $\Delta P_i$ is the i-th pressure difference, $P_i$ is the i-th measured value of atmospheric pressure and $P_{rif}$ is the reference value.

4. The method according to claim 1, wherein, when the electronic apparatus is in the second operative condition, at least one of the first and second height differences is not null, and
    wherein the calculating the first and the second pressure differences comprises applying the following formula:

$$\Delta P_i = P_i - P_{rif} + \Delta P_{hi},$$

where $i=1$ indicates the first movable barometer and $i=2$ indicates the second movable barometer, $\Delta P_i$ is the i-th pressure difference, $P_i$ is the i-th measured value of atmospheric pressure, $P_{rif}$ is the reference value and $\Delta P_{hi}$ is an i-th predefined atmospheric pressure difference directly proportional, in absolute value, to the i-th height difference between the i-th movable barometer and the common reference point when the electronic apparatus is in the second operative condition.

5. The method according to claim 1, wherein the determining the first and the second calibrated values when the electronic apparatus is in the first operative condition comprises calculating, for the first calibrated value, a sum of the new first measured value and the first pressure difference and, for the second calibrated value, a sum of the new second measured value and the second pressure difference.

6. The method according to claim 1, wherein the acquiring the new first and second measured values and the determining the first and the second calibrated values are performed, in succession to each other, periodically when the electronic apparatus is in the first operative condition.

7. The method according to claim 1, comprising, when the electronic apparatus is in the second operative condition, determining, by the main control unit, said first and second calibrated values;
    the first calibrated value being, when the electronic apparatus is in the second operative condition, equal to the reference value if the first height difference of the first movable barometer is null, or equal to a sum of the reference value and the first pressure difference if the first height difference of the first movable barometer is not null; and the second calibrated value being, when the electronic apparatus is in the second operative condition, equal to the reference value if the second height difference of the second movable barometer is null, or equal to a sum of the reference value and the second pressure difference if the second height difference of the second movable barometer is not null.

8. The method according to claim 1, comprising at least one of the following:
determining, by the main control unit, whether one of the first and the second movable barometers is in physical contact with the fixed device and is electromagnetically coupled to the fixed device so as to allow the electric charging thereof by the fixed device, wherein the determining whether the electronic apparatus is in the second operative condition is performed if one of the first and the second movable barometer is in physical contact with the fixed device and is electromagnetically coupled to the fixed device; and
if the electronic apparatus is not in the second operative condition, generating, by the main control unit, a signal of request of charging of the first and the second movable barometers.

9. The method according to claim 1, comprising a predefined time interval elapsing after determining the electronic apparatus is in the second operative condition and before acquiring the first measured value.

10. An electronic apparatus comprising:
a fixed charging dock-station having a common reference point;
a first and a second movable barometer operatively couplable to the charging dock-station, the charging dock-station being configured to:
in a first operative condition, in response to at least one of the first and the second movable barometers spaced from the charging dock-station, stop charging the at least one of the first and the second movable barometers; and
in a second operative condition, in response to the first and the second movable barometers being in physical contact with and electromagnetically coupled to the charging dock-station, charge the first and the second movable barometers, the first and the second movable barometers being at respective predefined height differences with respect to the common reference point in the second operative condition;
a main control unit operatively coupled to the first and the second movable barometers and configured to:
in response to the second operative condition, acquire:
a first measured value of atmospheric pressure through the first movable barometer;
a second measured value of atmospheric pressure through the second movable barometer; and
a reference value of atmospheric pressure at the common reference point;
calculate a first pressure difference as a function of the first measured value and of the reference value, and a second pressure difference as a function of the second measured value and of the reference value; and
when the electronic apparatus switches from the second operative condition to the first operative condition:
acquire a new first measured value of atmospheric pressure through the first movable barometer and a new second measured value of atmospheric pressure through the second movable barometer; and
determine a first calibrated value of atmospheric pressure as a function of the new first measured value and of the first pressure difference, and a second calibrated value of atmospheric pressure as a function of the new second measured value and of the second pressure difference.

11. The electronic apparatus according to claim 10, wherein the reference value is acquired through one of the following:
a fixed barometer of the fixed charging dock-station, the fixed barometer defining said common reference point, the reference value being a fixed measured value of atmospheric pressure acquired through the fixed barometer or an average of the fixed measured value and the first measured value and/or the second measured value;
the first movable barometer, defining said common reference point, the reference value being the first measured value or an average of the first measured value and the second measured value and/or the fixed measured value; and
the second movable barometer, defining said common reference point, the reference value being the second measured value or an average of the second measured value and the first measured value and/or the fixed measured value.

12. The electronic apparatus according to claim 10, comprising at least a third movable barometer operatively couplable to the fixed charging dock-station and electrically chargeable by the fixed charging dock-station through wireless and induction charging, the third movable barometer defining said common reference point;
wherein in the first operative condition of the electronic apparatus at least one of the first, the second and the third movable barometers is at a distance from the fixed charging dock-station and is electromagnetically decoupled from the fixed charging dock-station so as to prevent the electric charging thereof by the fixed charging dock-station, and in the second operative condition of the electronic apparatus the first, the second and the third movable barometers are in physical contact with the fixed charging dock-station and are electromagnetically coupled to the fixed charging dock-station so as to allow the electric charging thereof by the fixed charging dock-station;
the main control unit being further operationally coupled to the third movable barometer and being further configured to:
if the electronic apparatus is in the second operative condition, acquire a third measured value of atmospheric pressure through the third movable barometer;
calculate a third pressure difference as a function of the third measured value and of the reference value; and
when the electronic apparatus switches from the second operative condition to the first operative condition:
acquire a new third measured value of atmospheric pressure through the third movable barometer; and
determine a third calibrated value of atmospheric pressure as a function of the new third measured value and of the third pressure difference;
wherein the reference value is the third measured value or is an average of the third measured value and the first measured value and/or the second measured value.

13. The electronic apparatus according to claim 10, wherein said predefined height differences are null, or wherein at least one of said predefined height differences is not null.

14. A method comprising:
  determining an apparatus is in a first operative condition, the first operative condition being when first and second movable devices of the apparatus are coupled to a fixed device of the apparatus, the first movable device including a first barometer, the second movable device including a second barometer, and the fixed device including a third barometer;
  acquiring, via a control unit, a first atmospheric pressure of the first barometer, a second atmospheric pressure of the second barometer, and a third atmospheric pressure of the third barometer;
  calculating, via the control unit, first and second pressure differences, the first pressure difference from the first and third atmospheric pressures, the second pressure difference from the second and third atmospheric pressures;
  transitioning to a second operative condition in response to decoupling at least one of the first and second moveable devices from the fixed device;
  acquiring, via the control unit, new atmospheric pressures including a new first atmospheric pressure of the first barometer and a new second atmospheric pressure of the second barometer; and
  calculating, via the control unit, calibrated first and second atmospheric pressures from the new first and second atmospheric pressures and the first and second pressure differences.

15. The method of claim 14, comprising a predefined time interval lapsing after determining the apparatus is in the first operative condition and before acquiring the atmospheric pressures.

16. The method according to claim 14, comprising, after calculating first and second pressure differences:
  calculating, via the control unit, calibrated first and second atmospheric pressures as a function of the third atmospheric pressure.

17. The method according to claim 16, comprising iterating acquiring new atmospheric pressures and calculating calibrated first and second atmospheric pressures until the apparatus is in the first operative condition.

18. The method according to claim 14, wherein the apparatus includes more than two movable devices.

19. The method according to claim 14, wherein, when the apparatus is in the first operative condition, the movable devices are at predefined distance from the fixed device.

20. The method according to claim 19, wherein, when the apparatus is in the second operative condition, at least one of the movable devices has a first distance from the fixed device that is different than the predefined distance.

\* \* \* \* \*